United States Patent Office 2,980,975
Patented Apr. 25, 1961

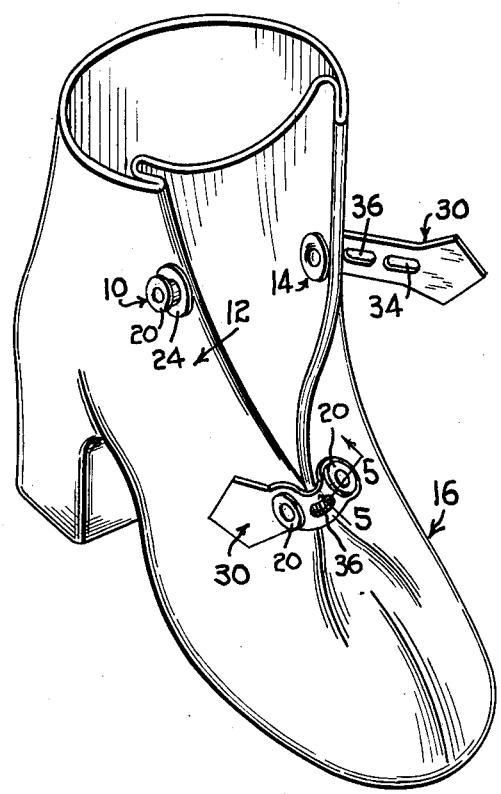
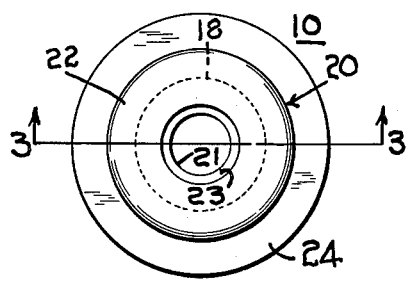
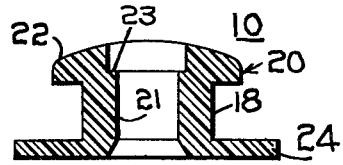
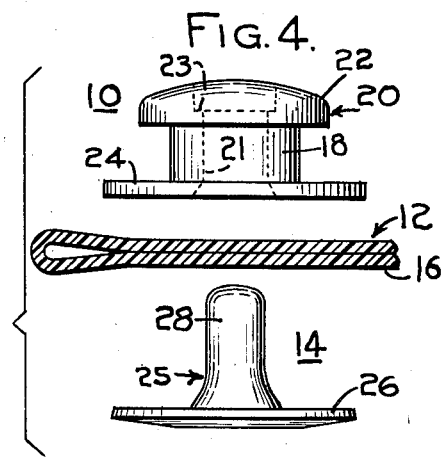
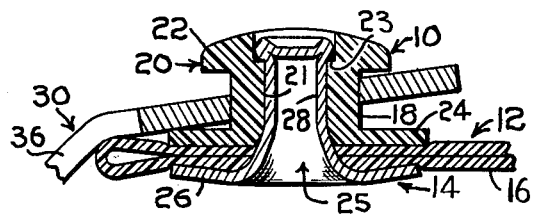
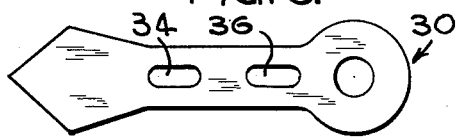
INVENTOR:
ERNEST E. JONES,
BY Robert E Ross
ATTORNEY.

2,980,975

FASTENING DEVICE

Ernest E. Jones, Melrose, Mass., assignor to United-Carr Fastener Corporation, Cambridge, Mass., a corporation of Delaware Filed Sept. 28, 1956, Ser. No. 612,703

2 Claims. (Cl. 24—90)

This invention relates generally to fastening devices and has particular reference to a fastener organization for use with water-impervious membranes.

Fastener studs are commonly made of metal and although such material provides a suitable attachment for materials other than synthetic plastic sheet, it has been found unsatisfactory for use with that material. The compression of the plastic sheeting between metal fastening elements shows a tendency to weaken the material to such an extent that it will result in a tearing action on the plastic sheeting.

In accordance with my invention, I utilize a suitable synthetic organic plastic which while firm has substantial elastic compressibility which during the assembly operation tightly compresses the material effectuating a water-tight seal without cutting into the plastic sheet.

The object of this invention is to provide a fastener formed from a non-metallic polymeric material suitable for use on water-impervious garments and in its preferred form particularly suitable for attachment to articles of synthetic plastic sheeting, among which may be instanced raincoats, waterproof head coverings, rainboots, bags or envelopes.

A further object of this invention is to provide a fastener stud assembly in which a resilient plastic stud is retained in a supporting sheet by an attaching member having means extending through the sheet and disposed within the stud aperture to a point above an interior shoulder, with the means being headed over by a suitable tool to maintain the water-tight integrity as to the stud.

A further object of this invention is to provide a stud member having a wide flange substantially larger in diameter than the post for distributing the compression stresses over a greater area and for gripping the material tightly to the base of the attaching means.

A further object of this invention is to provide a stud member suitable for anchoring a flexible strap on one edge of the garment and further suitable as a button on the opposite edge.

A further object of this invention is to provide a stud member which is suitable for use on both edges of a garment thus eliminating the number of parts a manufacturer has to stock.

Other objects of this invention will, in part, be obvious, and will, in part, appear hereinafter.

In the drawing:

Fig. 1 is a perspective view of a rainboot having fasteners thereon embodying the features of the invention;

Fig. 2 is a plan view of a stud member used in the assembly of Fig. 1;

Fig. 3 is a view in section of the stud member taken on line 3—3 of Fig. 2;

Fig. 4 is a view of the stud member and an eyelet respectively aligned ready for attachment to a water-impervious membrane.

Fig. 5 is a section of the stud member on line 5—5 of Fig. 1; and

Fig. 6 is a plan view of the strap member.

Referring to the drawing, there is illustrated a fastener stud 10, which is adapted for attachment to a supporting sheet 12, by means of an attaching member 14.

The stud 10 is preferably formed of a resilient plastic, and comprises a post 18, said post having integrally secured at one end thereof a shouldered head portion 20 tapered marginally at its outer end 22, the head having a central axial aperture 21, with internal shoulders 23 faced toward the head end and spaced axially inward from the head, and an integral peripheral flange 24 at the base.

The attaching member 14 consists of an eyelet 25 and a generally circular base portion 26, and a projecting shank with a closed end 28.

To assemble the stud 10 and the attaching member 14 onto the supporting sheet 12, the stud 10 is aligned on the opposite side of the sheet 12, and the eyelet is pierced through the sheet so that the eyelet 25 enters the central axial aperture 21 of the stud member and projects above the interior shoulder 23 where it can be headed over by a suitable tool without perforation.

Referring to Fig. 1 and Fig. 5 of the drawing, there is illustrated a stud member in position on a rainboot 16 having a fastening strap 30 secured under the shouldered head portion 20 so that it may be engaged to an opposite stud member by button holes 34 and 36 for a suitable closure.

A non-metallic polymeric material which I have successfully used and which is the best material for the purpose now known to me is a polyamide commercially designated by the term nylon. The skill of the plastics maker and a routine test under simulated practical conditions and not requiring experiment of an inventive character, will disclose the availability of a given material for the use intended. Examples of such plastics are polyamide resins, cellulose acetate, cellulose acetate butyrate, polyethylene or vinyl resins.

Since certain obvious modifications may be made in the device without departing from the scope of the invention, it is intended that all matter contained herein be interpreted in an illustrative and not in a limiting sense.

I claim:

1. A water-tight fastener stud assembly for mounting on a supporting sheet, said assembly including a fastening strap secured at one end to a supporting sheet, a plastic stud mounted on said supporting sheet in spaced relation from said fastening strap with the opposite end of said strap extending toward said stud for attachment thereto by means of openings formed therein, and a metal eyelet retaining said stud on said supporting sheet in a water-impervious state, said stud including a flat planar base portion positioned against one face of said supporting sheet, a neck portion integrally secured in transverse relationship to said base portion and extending outwardly therefrom, said base portion and said neck portion having a centrally positioned axially extending bore therein, and a head portion integrally secured to the opposite end of said neck in transverse relationship thereto and in spaced parallel relationship to said base portion, the diameter of said head portion being greater than that of said neck portion but less than that of said base portion, said head portion having a central bore therein in axial alignment with but of a diameter greater than that of the central bore of said neck portion forming a circumferential, outwardly extending shoulder portion lying in transverse relationship to said neck portion, said metal eyelet including a base portion positioned against the opposite face of said supporting sheet, and a hollow shank portion extending through an opening in said supporting sheet into the bore of said base portion and said neck portion, the upper free end of said shank portion being closed and thereby retaining the stud in a water-impervious state outwardly flared and in tight engagement with the circumferential shoulder portion of said head portion, with respect to the supporting sheet.

2. In a stud assembly mounted on a supporting sheet including a stud and an eyelet in association therewith, securing same to a supporting sheet, the improvement of a plastic stud mounted on said supporting sheet, and a metal eyelet retaining said stud on said supporting sheet in a water-impervious state, said stud including a flat planar base portion positioned against one face of said supporting sheet, a neck portion integrally secured in transverse relationship to said base portion and extending outwardly therefrom, said base portion and said neck portion having a centrally positioned axially extending bore therein, and a head portion integrally secured to the opposite end of said neck in transverse relationship thereto and in spaced parallel relationship to said base portion, the diameter of said head portion being greater than that of said neck portion but less than that of said base portion, said head portion having a central bore therein in axial alignment with but of a diameter greater than that of the central bore of said neck portion forming a circumferential, outwardly extending shoulder portion lying in transverse relationship to said neck portion, said metal eyelet including a base portion positioned against the opposite face of said supporting sheet, and a hollow shank portion extending through an opening in said supporting sheet into the bore of said base portion and said neck portion, the upper free end of said shank portion being closed and outwardly flared and in tight engagement with the circumferential shoulder portion of said head portion, thereby retaining the stud in a water-impervious state with respect to the supporting sheet.

References Cited in the file of this patent

UNITED STATES PATENTS

| 70,039 | Somers | Oct. 22, 1867 |
| 243,534 | Ericsson | June 28, 1881 |
| 296,216 | Platt | Apr. 1, 1884 |
| 621,541 | Richardson | Mar. 21, 1899 |
| 1,272,674 | Keller | July 16, 1918 |
| 2,172,594 | Purinton | Sept. 12, 1939 |
| 2,193,605 | Thor | Mar. 12, 1940 |
| 2,668,340 | Jones | Feb. 9, 1954 |
| 2,745,160 | Jones | May 15, 1956 |
| 2,759,238 | Williams | Aug. 21, 1956 |
| 2,845,670 | Brown et al. | Aug. 5, 1958 |

FOREIGN PATENTS

| 287,279 | Germany | Sept. 16, 1915 |
| 438,306 | France | Mar. 12, 1912 |
| 838,960 | Germany | May 15, 1952 |

UNITED STATES PATENT OFFICE
CERTIFICATE OF CORRECTION

Patent No. 2,980,975                                April 25, 1961

Ernest E. Jones

It is hereby certified that error appears in the above numbered patent requiring correction and that the said Letters Patent should read as corrected below.

Column 3, lines 4, 5, and 6, for "thereby retaining the stud in a water-impervious state outwardly flared and in tight engagement with the circumferential shoulder portion of said head portion," read -- outwardly flared and in tight engagement with the circumferential shoulder portion of said head portion, thereby retaining the stud in a water-impervious state --.

Signed and sealed this 21st day of November 1961.

(SEAL)
Attest:

ERNEST W. SWIDER
Attesting Officer

DAVID L. LADD
Commissioner of Patents
USCOMM-DC